United States Patent [19]

Sroussi

[11] 4,125,473
[45] Nov. 14, 1978

[54] POLYCRYSTALLINE FERRIMAGNETIC GARNET HAVING A NARROW GYROMAGNETIC RESONANCE LINE WIDTH AND A LOW MAGNETIC MOMENT

[75] Inventor: Roland Sroussi, Paris, France

[73] Assignee: Thomson-CSF, Paris, France

[21] Appl. No.: 844,916

[22] Filed: Oct. 25, 1977

[30] Foreign Application Priority Data

Oct. 26, 1976 [FR] France ................................. 76 32241

[51] Int. Cl.² ............................................. C04B 35/40
[52] U.S. Cl. ............................... 252/62.57; 252/62.59; 252/62.63
[58] Field of Search ................. 252/62.57, 62.59, 62.63

[56] References Cited

U.S. PATENT DOCUMENTS

| 3,006,854 | 10/1961 | Geller | 252/62.57 |
| 3,156,651 | 11/1964 | Geller | 252/62.57 |
| 3,639,247 | 2/1972 | Takamizawa et al. | 252/62.57 |
| 3,763,045 | 10/1973 | Takamizawa et al. | 252/62.57 |
| 4,034,358 | 7/1977 | Blank | 252/62.57 X |

OTHER PUBLICATIONS

Novik, "J. Appl. Physics", vol. 40, No. 13, 1969, pp. 5184-5188.
Winkler, "I.E.E.E. Transactions on Magnetics", No. 3, 1971, pp. 773-776.
Polkarov, "Chemisches Zentrlblatt", vol. 139, (1968) p. 44.
Schieber, "Experimental Magneto Chemistry (1967) pp. 360-365.

Primary Examiner—Jack Cooper
Attorney, Agent, or Firm—Oblon, Fisher, Spivak, McClelland & Maier

[57] ABSTRACT

A garnet having a magnetic moment of less than 600 G and a resonance line width of less than 100 Oe for operation from 1 to 5 Gc/s. The garnet corresponds to the formula:

$$Y_{3-x-y} Ca_{x+y} Fe_{5-x-y} Ge_x Zr_y O_{12}$$

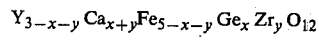

where $x$ has a value of from 0.75 to 0.85 and $y$ a value of from 0.05 to 0.35.

3 Claims, No Drawings

POLYCRYSTALLINE FERRIMAGNETIC GARNET HAVING A NARROW GYROMAGNETIC RESONANCE LINE WIDTH AND A LOW MAGNETIC MOMENT

This invention relates to polycrystalline ferrimagnetic garnets having a narrow gyromagnetic resonance line width ($\Delta H$) and a magnetic moment ($4\pi M_S$) not exceeding 600 gauss. This type of material may be used in particular in a frequency range from 1 to 5 Gc/s. Polycrystalline ferrimagnetic garnets of yttrium and aluminium are known which satisfy the requirements mentioned above in regard to line width and magnetic moment, but which have the the following disadvantages:

a high sintering temperature (1500° C.);

an excessive low Curie point which gives rise to a lack of stability at elevated temperature (100° C.).

The object of the present invention, is to obviate these disadvantages.

According to the invention, there is provided a polycristalline ferrimagnetic garnet having the following global chemical formula:

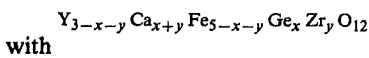

with $0.75 \leq x \leq 0.85$
$0.05 \leq y \leq 0.35$

In addition, if a relatively high Curie point is required, the following condition is fulfilled:

$x + y \leq 1$

These materials may be obtained by any of the known processes for producing polycrystalline ferrites, comprising for example the following steps:

(a) mixing in the presence of distilled water of alcohol of highly pure oxides or salts (purity higher than 99.9%) in quantities corresponding to the formula selected, taking into account the losses or additions of elements resulting from the following steps;

(b) initial crushing of said mixture for 24 hours in steel jars containing steel balls;

(c) drying in an oven followed by firing in a furnace at around 1200° C.;

(d) second crushing of the product obtained in aqueous or alcoholic medium over a period of from 36 to 48 hours under conditions identical with those applied in the initial crushing operation;

(e) drying an sieving the powder thus obtained;

(f) shaping either by pressing in a steel mould, which necessitates the incorporation of a binder (which has to be subsequently removed by heating to 600° C.), or by so-called "isostatic" pressing in a rubber mould; in either case, pressing is carried out under a pressure of approximately 1 tonne per square centimeter;

(g) sintering in an oxygen atmosphere at a temperature of around 1400° C. over a period ranging from 6 hours to 16 hours.

EXAMPLE

Garnet corresponding to formula (1) which:

$x = 0.8$
$y = 0.02$ i.e.:

   (2)

prepared by the steps recited hereabove.

The results obtained are set out in the following Table:

| $4\pi M_S$(gauss) | $\Delta H$ (oersteds) | $tg\ \delta \times 10^4$ | Curie point |
|---|---|---|---|
| 598 | 22 | < 1 | 170° C |

One possible explanation for these results is as follows:

(a) With regard to the value of the magnetic moment, the substitution for tetrahedral iron of germanium in a significant molar proportion reduces the magnetic moment, noting that the magnetic moment would be zero if the value $x = 1$ were reached;

(b) With regard to the gyromagnetic resonance line width, the substitution of Zr for octahedral iron gives an anisotropy which promotes a reduction in this line width, but also an increase in the magnetic moment. Accordingly, there is a compromise between the result required in the preceding paragraph and the result required in the present paragraph. This compromise is satisfactory in the region of values indicated above for $x$ and $y$;

(c) With regard to the low losses of high frequency (tg $\delta$), the results are explained by the absence of divalent iron due to good preparation conditions and to the relatively high firing temperature.

What I claim is:

1. A polycrystalline ferrimagnetic garnet characterized by a magnetic moment of less than 600 g, a resonance line width of less than 100 Oe and, having the formula:

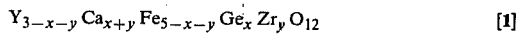   [1]

with $0.75 \leq x \leq 0.85$
$0.05 \leq y \leq 0.35$.

2. A polycrystalline ferrimagnetic garnet as claimed in claim 1, wherein the parameters $x$ and $y$ of the formula additionally satisfy the condition:

$x + y \leq 1$

3. A polycrystalline ferrimagnetic garnet as claimed in claim 2, wherein the parameters $x$ and $y$ of the formula (1) have the following values:

$x = 0.8$
$y = 0.2$.

* * * * *